United States Patent [19]
Muraki et al.

[11] Patent Number: 5,294,421
[45] Date of Patent: Mar. 15, 1994

[54] METHOD FOR CATALYTICALLY PURIFYING EXHAUST GAS

[75] Inventors: Hideaki Muraki, Nagoya; Tokuta Inoue, Mishima; Kiyohiko Oishi, Toyota; Kenji Katoh, Sunto, all of Japan

[73] Assignee: Toyota Jidosha Kabushiki Kaisha, Toyota, Japan

[21] Appl. No.: 799,315

[22] Filed: Nov. 27, 1991

[30] Foreign Application Priority Data

Nov. 28, 1990 [JP] Japan .................. 2-322638

[51] Int. Cl.⁵ .............. B01J 8/00; C01B 21/00; C01B 23/00
[52] U.S. Cl. ...................... 423/239.1; 423/213.5
[58] Field of Search .......... 423/235, 235 D, 351, 423/239, 239 A, 213.5

[56] References Cited

U.S. PATENT DOCUMENTS

| | | | |
|---|---|---|---|
| 3,346,328 | 10/1967 | Sergeys et al. | 23/2 |
| 3,741,725 | 6/1973 | Graham | 423/213.5 |
| 4,297,328 | 10/1981 | Ritscher et al. | 423/213.2 |
| 4,407,785 | 10/1983 | Pfefferle | 423/213.5 |
| 4,867,954 | 9/1989 | Staniulis et al. | 423/239 |
| 4,950,461 | 8/1990 | Schwetje et al. | 423/239 |

FOREIGN PATENT DOCUMENTS

| | | |
|---|---|---|
| 0272136 | 6/1988 | European Pat. Off. . |
| 0358124 | 3/1990 | European Pat. Off. . |
| 0370523 | 5/1990 | European Pat. Off. . |
| 2343505 | 10/1977 | France . |
| 60-125250 | 7/1985 | Japan . |
| 63-100919 | 5/1988 | Japan . |
| 63-283727 | 11/1988 | Japan . |

*Primary Examiner*—Gregory A. Heller
*Attorney, Agent, or Firm*—Oblon, Spivak, McClelland, Maier & Neustadt

[57] ABSTRACT

A method for purifying an oxygen excess exhaust gas by catalytically reducing nitrogen oxides contained in the exhaust gas, which comprises bringing a catalyst comprising at least one noble metal supported on a carrier composed mainly of an oxide or a complex oxide of at least one metal selected from rare earth metals and metals of the group IV A of the periodic table of elements into contact the exhaust gas.

4 Claims, 6 Drawing Sheets

METHOD FOR CATALYTICALLY PURIFYING EXHAUST GAS

BACKGROUND OF THE INVENTION

1. Field of the Invention

The present invention relates to a method for catalytically purifying an exhaust gas, and more particularly, it relates to a method for catalytically purifying an exhaust gas which efficiently purifies $NO_x$ (nitrogen oxides) in an oxygen excess exhaust gas, i.e., an exhaust gas containing oxygen in an amount excessive to the oxygen amount necessary for completely oxidizing reductive substances such as carbon monooxide, hydrogen and hydrocarbons, etc., contained in the exhaust gas.

2. Description of the Related Art

Known in the art are a large number of catalysts for purifying exhaust gases, which catalysts purify an exhaust gas by effecting, at the same time, an oxidation of carbon monooxide (CO) and hydrocarbons (HC) and a reduction of nitrogen oxides ($NO_x$) in the exhaust gas, for purifying the exhaust gases of automobiles. Typical examples of such a catalyst include those prepared by coating a γ-alumina slurry on a refractory support, such as cordierite, and calcining the coating and supporting thereon a noble metal, such as Pd, Pt and Rh.

Nevertheless, the performances of the above-mentioned catalysts for purifying exhaust gas are greatly influenced by the air-fuel ratio of the engine, and when a large amount of oxygen is present on the lean side, i.e., a lean mixture after combustion, although the oxidation actively proceeds little reduction of $NO_x$ occurs. Conversely, on the rich side with a smaller air-fuel ratio, the amount of oxygen in the exhaust gas becomes smaller, and thus little oxidation occurs but a large reduction of $NO_x$ occurs. Recently, in response to a demand for lower fuel costs, a lean burn running has been practiced which effects a combustion with an oxygen excess mixed gas during normal running, and there is a need for a catalyst which can sufficiently purify $NO_x$ even during a lean burn running.

Under the above circumstances, there has been proposed a $NO_x$ purifying catalyst having Cu, Co or Pt supported on a zeolite carrier. Among these catalysts, for example, the Pt/zeolite catalyst at a catalyst inlet gas temperature of about 200° C., the Cu/zeolite catalyst at about 430° C., and the Co/zeolite catalyst at about 490° C., respectively, purify $NO_x$ at a high efficiency, as shown in FIG. 1.

As described above, with the catalyst of the prior art having Cu, Co or Pt supported on a zeolite carrier, $NO_x$ cannot be purified at high efficiency at around 300° C., which is the exhaust temperature during a steady lean burn running of the engine.

SUMMARY OF THE INVENTION

Accordingly, the objects of the present invention are to eliminate the above-mentioned disadvantages of the prior art and to provide a method for catalytically purifying $NO_x$ efficiently, within the temperature range mentioned above (around 300° C.).

Other objects and advantages of the present invention will be apparent from the following description.

In accordance with the present invention, there is provided a method for purifying an oxygen excess exhaust gas by catalytically reducing nitrogen oxides ($NO_x$) contained in the oxygen excess exhaust gas, which comprises bringing a catalyst comprising at least one noble metal supported on a carrier composed mainly of an oxide or a complex oxide of at least one metal selected from the group consisting of rare earth metals and metals of the group IV A of the periodic table of elements into contact with the exhaust gas.

In accordance with the present invention, there is also provided a method for purifying an oxygen excess exhaust gas by catalytically reducing nitrogen oxides ($NO_x$) contained in the oxygen excess exhaust gas, which comprises bringing a catalyst comprising an oxide or a complex oxide of at least one metal selected from the group consisting of rare earth metals and metals of the group IV A of the periodic table of elements and at least one noble metal, supported on a carrier comprising alumina, into contact with the exhaust gas.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
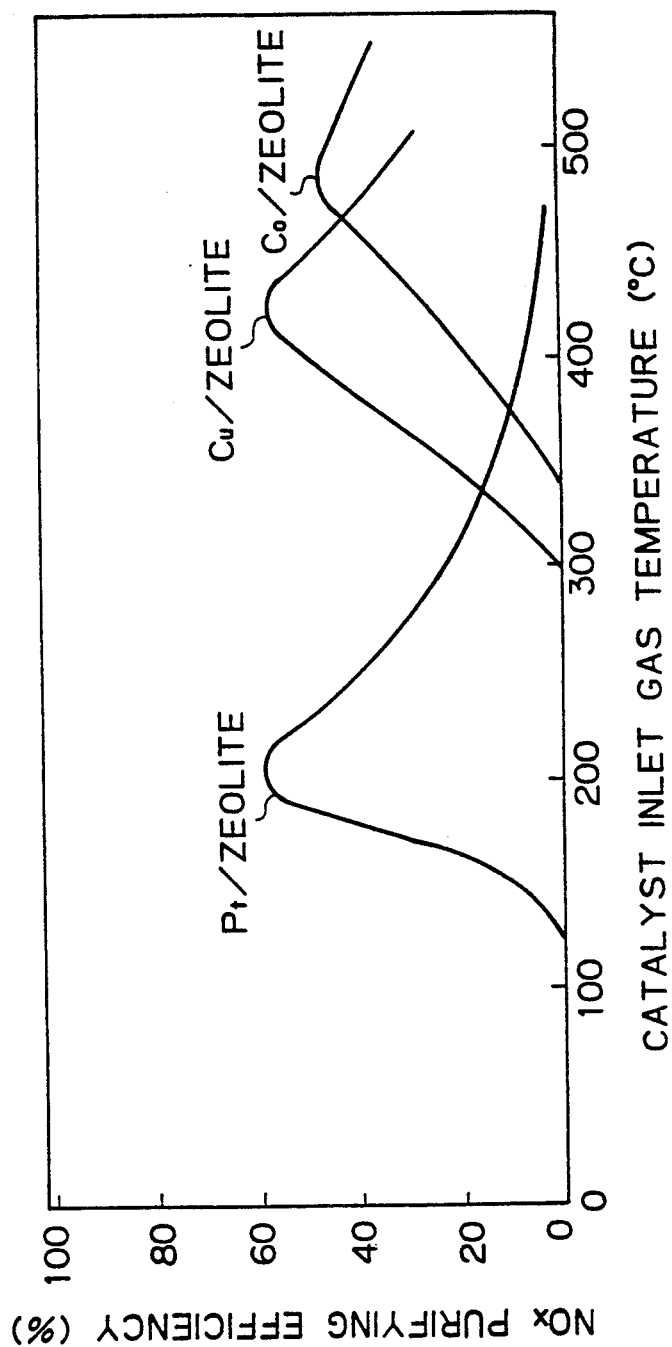
FIG. 1 is a graph showing the relationship between the catalyst entering gas temperature and $NO_x$ purifying efficiency of the Pt/zeolite, Cu/zeolite and Co/zeolite of the prior art.
Figure 2:
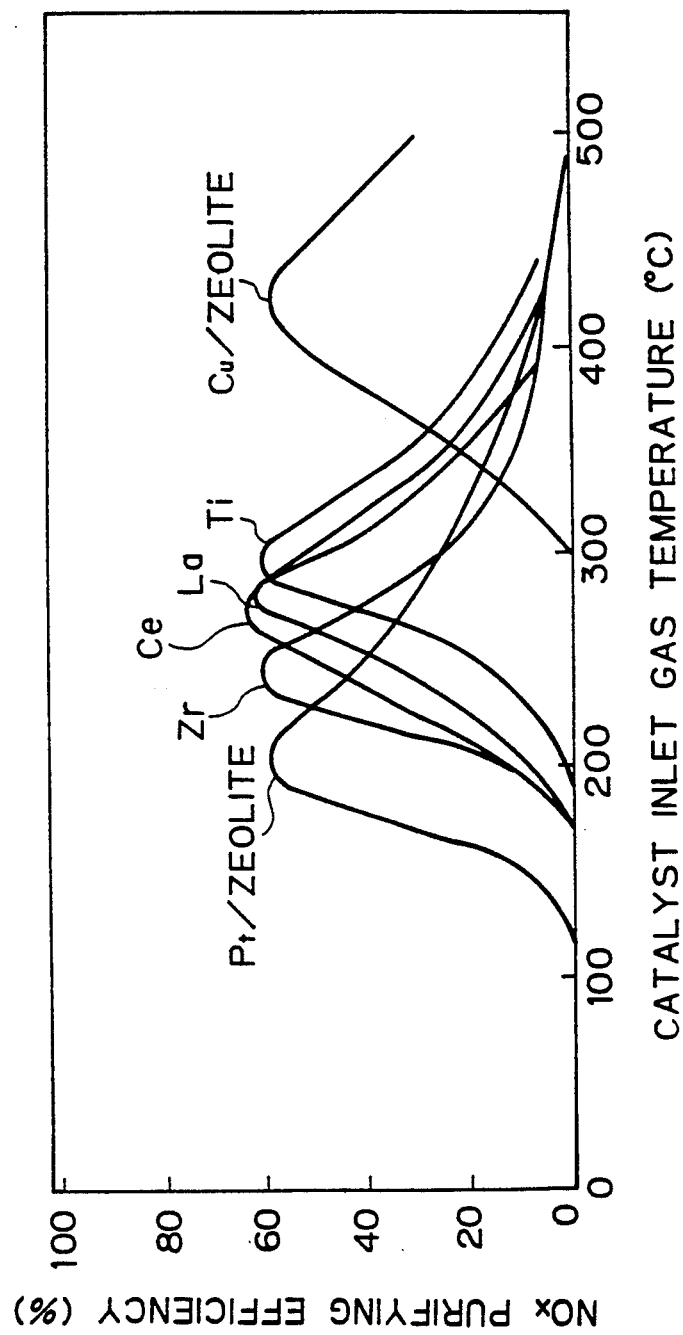
FIG. 2 is a graph showing the relationship between the catalyst inlet gas temperature and $NO_x$ purifying efficiency of the respective catalysts of Example 1 and Comparative Example 1.
Figure 3:
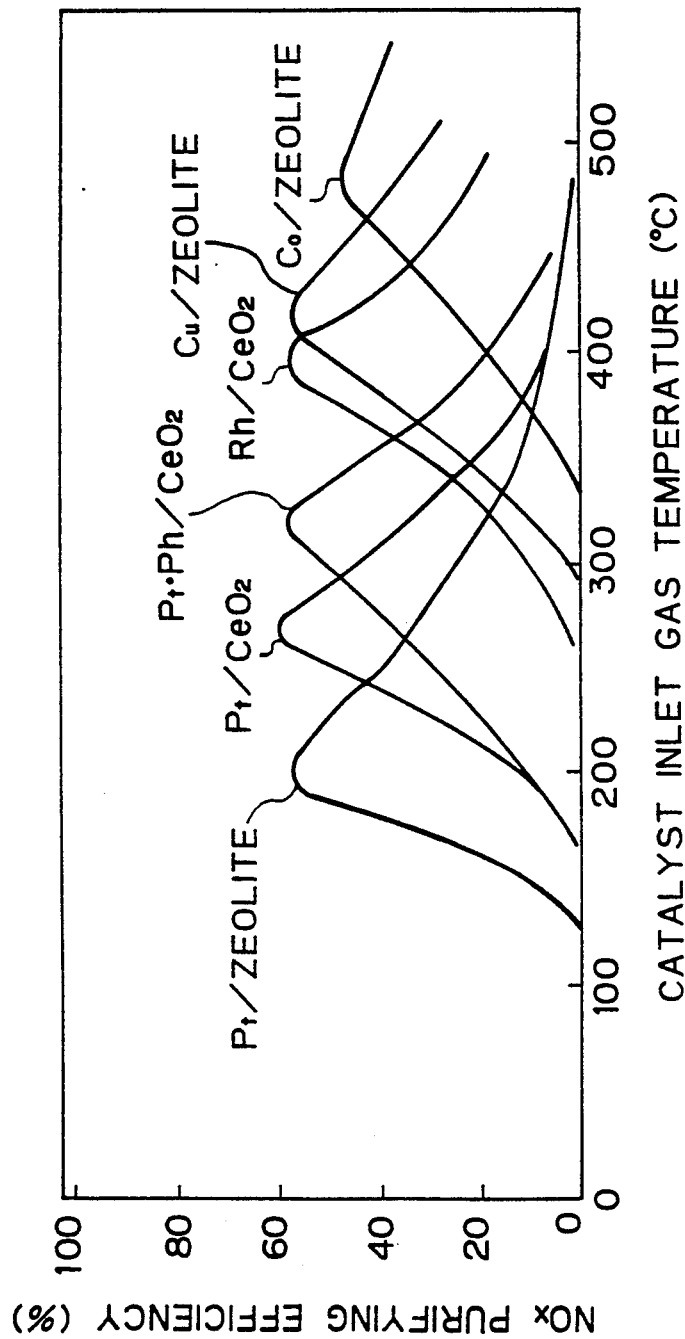
FIG. 3 is a graph showing the relationship between the catalyst inlet gas temperature and $NO_x$ purifying efficiency of the respective catalysts of Example 2 and Comparative Example 2.

As mentioned above, according to the present invention, by using an oxide or a complex oxide of rare earth metals and/or metals of the group IV A of the periodic table of elements, $NO_x$ in the exhaust gas of a lean burn running engine can be purified at a high efficiency.

As the rare earth metals usable in the present invention, for example, La, Ce, Pr, Nd, and Sm are included, and preferably La and Ce are used. As the metal of the group IV A of the periodic table of elements usable in the present invention, Ti, Zr, and Hf are included, and preferably Ti and Zr are used. These metals are used as oxides (e.g., $La_2O_3$, $CeO_2$, $TiO_2$, $ZrO_2$) or complex oxides (e.g., $C_{1-x}La_xO_{2-x/2}$, $Ce_{1-x}Zr_xO_{2-x/2}$), respectively, either alone or as any desired mixture thereof.

As the nobel metals usable in the present invention, for example, platinum, palladium, and rhodium are included, and preferably platinum or rhodium are used. These noble metals also can be used either alone or as any desired mixture thereof.

In the present invention, any alumina generally employed as the carrier for a purifying catalyst of the prior art can be used.

The atomic ratio, based on the metal atoms, of the noble metal/rare earth metal and/or the group IV A metal of the periodic table of elements in the purifying catalyst of the present invention is not particularly limited, but preferably is 0.001/1 to 1/1. When supported on alumina, the noble metal is preferably supported in an amount of 0.001 to 0.1 part by weight, based on 1 part by weight of alumina.

According to the present invention, following general procedures, the above catalyst is usually arranged within a reactor, an exhaust gas is introduced into the reaction vessel wherein the catalyst and the exhaust gas are brought into contact to purify nitrogen oxides by a reduction thereof, and then the purified exhaust gas is discharged from the reactor, whereby the exhaust gas is purified. The space velocity (SV) during the introduction of the exhaust gas into the catalyst layer is not particularly limited but, for example, is preferably 10,000 to 200,000/hour.

According to the present invention, by using Pt for the catalyst metal and an oxide or a complex oxide of rare earth metals or the group IV A metals of the periodic table of elements for the carrier, the respective high efficiency $NO_x$ purifying temperatures become approximately the same as the exhaust temperature during a steady running of a lean burn engine, and the $NO_x$ during the steady running of such an automobile can be purified at a high efficiency. Also, by constituting the catalyst of several kinds of oxides or complex oxides according to the present invention, the range of high efficiency $NO_x$ purifying temperatures can be broadened, and $NO_x$ can be purified in a broad range of from a low temperature to a high temperature.

EXAMPLES

The present invention will now be further illustrated by, but is by no means limited to, the following Examples and Comparative Examples. In the following Examples, "parts" indicates "parts by weight" unless otherwise particularly noted.

EXAMPLE 1 AND COMPARATIVE EXAMPLE 1

On pellets of the respective oxide carriers of Zr, Ce, La, and Ti was supported 1 g/liter of Pt, and compared with a comparative catalyst (Pt/zeolite).

Preparation of catalyst

Oxide pellets of Zr, Ce and La were prepared by spray drying the aqueous solution of the nitrate of the respective metals to prepare powders of the respective components, and then calcining the powders at 800° C. Then the calcined product was mixed with an aqueous solution containing 5% of polyvinyl alcohol, and pellets about 3 mm in diameter were prepared. Ti-0102 ⅛ inch pellets produced by HARSHAW were used for the pellets of Ti oxide. These pellets were impregnated with an aqueous dinitrodiamine platinum prepared so as to contain 1 g of platinum based on one liter of the carrier, dried and then calcined at 600° C. for 3 hours in air, to prepare the catalyst of the present invention. The Comparative catalyst of Pt/zeolite was prepared similarly to the catalyst of the present invention, but using the ZSM-5 type zeolite in place of the respective oxide powders used in the present invention. The Cu/zeolite catalyst was prepared similarly to the present invention after carrying Cu according to the ion-exchange method by using an aqueous Cu acetate solution on the above zeolite. The amount of Cu carried was 6.8 g based on 1 liter of the carrier.

Evaluation

Model gas composition (%): $CO_2=10$, $CO=0.1$, $H_2=0.033$, $THC(C_3H_6)=0.19$, $NO=0.067$, $O_2=4$, $H_2O=10$ Temperature elevation rate: 10° C./min.

The purifying capabilities of the above-prepared various catalysts were evaluated at SV=30,000/hour by using a model gas corresponding to A/F=18.

The results are shown in Table 1

TABLE 1

| Example | Carrier | Temperature exhibiting the maximum $NO_x$ purifying efficiency (°C.) |
|---|---|---|
| Example 1 | Zr | 240 |
| " | Ce | 270 |
| " | La | 275 |
| " | Ti | 295 |
| Comparative Example 1 | Pt/zeolite | 200 |
| Comparative Example 1 | Cu/zeolite | 430 |

From Table 1 it is clear that a catalyst exhibiting the optimum $NO_2$ purifying characteristics can be prepared by selecting the carrier.

EXAMPLE 2 AND COMPARATIVE EXAMPLE 2

$Pt/CeO_2$, $Rh/CeO_2$ and $Pt-Rh/CeO_2$ monolithic catalysts were prepared and compared with Comparative catalysts (Pt/zeolite, Cu/zeolite, Co/zeolite) with respect to the temperature exhibiting the maximum $NO_x$ purifying efficiency.

Preparation of catalyst a) Preparation of slurry

To 100 parts of the Ce oxide prepared in Example 1 were added 70 parts of alumina sol (alumina content 10%), 15 parts of an aqueous 40% by weight of aluminum nitrate and 30 parts of water, followed by stirring and mixing, to prepare a slurry for coating.

b) Coating and calcination

A monolithic honeycomb carrier made of cordierite was dipped in water, and after blowing off superfluous water, was dipped in the slurry obtained in the above a) and then taken out, and the superfluous slurry was blown off followed by drying at 80° C. for 20 minutes, and further, by drying at 250° C. for one hour. The coated amount was 100 g based on 1 liter of the carrier.

c) Carrying noble metal

The sintered product obtained as described above was dipped in an aqueous solution of a predetermined concentration of dinitrodiamine platinum in the case of Pt, and in an aqueous solution of a predetermined concentration of rhodium chloride in the case of Rh so that 2 g of Pt or Rh based on 1 liter of the carrier was supported by impregnation, and dried at 80° C. for 20 minutes to prepare $Pt/CeO_2$ and $Rh/CeO_2$ catalysts. A $Pt-Rh/CeO_2$ catalyst was prepared by having Pt carried as described above, and then further having Rh carried as described above. The carried amounts were 1 g of Pt and 1 g of Rh based on one liter of the carrier.

Comparative catalysts a) Preparation of slurry

To 60 parts of a mixture of silica sol and alumina sol mixed to an Si/Al ratio of 30 as the binder were added 100 parts of powder of zeolite (Si/Al ratio 30; maximum highest size 5.4 A) and 60 parts of water, and the mixture was stirred and adjusted to a pH of 3 to 6 with an aluminum nitrate solution, to prepare a slurry for coating.

b) Coating

The coating was carried out in the same manner as the catalyst of the present invention as described above.

c) Ion-exchange carrying of Pt, Cu or Co

The above-prepared coated product was dipped in an aqueous dinitrodiamine platinum solution in the case of Pt, and aqueous solutions of the respective acetates in the case of Cu and Co, and allowed to stand for 24 hours so that 2 g of Pt, and 6.8 g each of Cu and Co ion-exchange were carried based on 1 liter of the carrier. Then, the products were dried at 80° C. for 20 minutes to provide Comparative catalysts.

Evaluation

Gas composition (%): $CO_2=9.2$, $CO=0.12$, $H_2=0.04$, $THC(C_3H_6)=0.34$, $NO=0.057$, $O_2=7.9$, $H_2O=10$ Temperature elevation rate: 20° C./minute The purifying performance of the above respective catalysts were evaluated at $SV=50,000$/hour by using a model gas corresponding to $A/F=20$.

The results are shown in Table 2.

TABLE 2

| Example | Catalyst | Temperature exhibiting the maximum NOx purifying efficiency (°C.) |
|---|---|---|
| Example 2 | Pt/CeO$_2$ | 270 |
| " | Pt-Rh/CeO$_2$ | 320 |
| " | Rh/CeO$_2$ | 400 |
| Comparative Example 2 | Pt/zeolite | 200 |
| Comparative Example 2 | Cu/zeolite | 430 |
| Comparative Example 2 | Co/Zeolite | 490 |

From the results in Table 2 it is clear that the temperature exhibiting the maximum $NO_x$ purifying efficiency of the catalyst of the present invention is between those of the Comparative catalysts, and that such a temperature range is preferable for a practical exhaust gas purifying system.

EXAMPLE 3 AND COMPARATIVE EXAMPLE 3

A catalyst having Pt/Cu supported on a monolithic honeycomb carrier made of cordierite coated with alumina was prepared and compared with the Pt/zeolite catalyst.

Preparation of catalyst a) Preparation of slurry

To 100 parts of alumina powder were added 70 parts of alumina sol (alumina content 10%), 15 parts of aqueous 40% by weight of alumina nitrate solution and 30 parts of water, followed by stirring and mixing, to prepare a slurry for coating.

b) Coating and calcination

A monolithic honeycomb carrier made of cordierite was dipped in water, and after blowing off superfluous water, dipped in the slurry obtained in the above a), taken out and the superfluous slurry blown off, followed by drying at 80° C. for 20 minutes, and further, by drying at 250° C. for one hour. The coated amount was 100 g based on one liter of the carrier, and was dipped in an aqueous cerium nitrate solution to have 0.3 mole of Ce supported based on 1 liter of the carrier, and calcined in air at 700° C. for 1 hour.

c) Supporting noble metal

The sintered product obtained as described above was dipped in an aqueous solution of a predetermined concentration of dinitrodiamine platinum so that 2 g of Pt was carried by impregnation based on 1 liter of the carrier, followed by drying at 80° C. for 20 minutes to prepare a Pt/CeO$_2$/alumina catalyst. For the Comparative catalyst, the Comparative catalyst of Pt/zeolite in Example 2 was employed.

Evaluation

The durable purifying capability of the above-prepared catalyst was examined under the following conditions.

After exposure in a real exhaust gas at $A/F=20$, space velocity$=60,000$/hours, and a catalyst inlet gas temperature of 700° C. for 50 hours, the purifying efficiencies of HC, CO, $NO_x$ were measured at a catalyst inlet gas temperature of 300° C. at an $A/F=18$.

Results

The catalyst of the present invention had a purifying efficiency of 98% for HC, 99% for CO, 38% for $NO_x$, and the comparative catalyst had an HC purifying efficiency of 88%, a CO purifying efficiency of 90%, and a $NO_x$ purifying efficiency of 13%.

EXAMPLE 4 AND COMPARATIVE EXAMPLE 4

A catalyst was prepared with an arrangement of Pt/TiO$_2$, Pt/CeO$_2$, Pt/ZrO$_2$, Pt/Al$_2$O$_3$ catalysts, juxtaposed in this order from the exhaust gas inlet toward the outlet side, and the relationship between the exhaust gas temperature flowing into the catalyst and the respective purifying efficiencies of $NO_x$, CO, HC was examined. Also, as comparative Examples, Pt/Al2O3 and Cu/zeolite were prepared and evaluated in the same manner as described above.

Catalyst preparation a) Preparation of slurry

To 100 parts of each powder of commercially available TiO$_2$, CeO$_2$, ZrO$_2$ and Al$_2$O$_3$ were added 70 parts of alumina sol (alumina content 10%), 15 parts by weight of an aqueous 40% by weight of aluminum nitrate solution, and 30 parts of water, followed by stirring and mixing, to prepare slurries for coating the respective oxides.

b) Coating and calcination

A monolithic honeycomb carrier made of 0.25 liter of cordierite was dipped in water, and after blowing off superfluous water, dipped in the slurry obtained in the above a), taken out, and the superfluous slurry was blown off, followed by drying at 80° C. for 20 minutes, and further by drying at 700° C. for 1 hour.

c) Supporting with noble metal

The sintered product obtained as described above was dipped in an aqueous solution of a predetermined concentration of dinitrodiamine platinum so that 2 g of Pt based on 1 liter of the carrier was carried by impregnation, and dried at 80° C. for 20 minutes to prepare the Pt catalysts according to the present invention supported on the respective carriers.

Comparative catalysts

The $Pt/Al_2O_3$ catalyst was prepared similarly as the catalyst of the present invention by using a monolithic honeycomb carrier made of 1 liter of cordierite. The Cu/zeolite catalyst was prepared as described below.

a) Preparation of slurry

To 60 parts of a mixture of silica sol and alumina sol mixed to an Si/Al ratio of 30 as the binder were added 100 parts of a zeolite powder (Si/Al ratio 30; maximum fine pore size 5.4 Å) and 60 parts of water, and the mixture was throughly stirred and adjusted to a pH of 3 to 6 with an aqueous aluminum nitrate solution, to prepare a slurry for coating.

b) Coating

The coating was effected in the same manner as the catalyst of the above present invention.

c) Ion-exchange supporting of Cu

The carrier was dipped in an aqueous solution of acetate of Cu, allowed to stand for 24 hours so that 4 g of Cu per 1 liter of the carrier ion-exchange was supported, and the product then dried at 80° C. for 20 minutes to provide a comparative catalyst.

Evaluation experiments

A 2000 cc L4 engine was run at A/F=20, a rotational speed of 2000 rpm, a torque of 100 Nm, and through a heat exchange between the exhaust gas discharged from the engine and water, the temperature at the catalyst was varied between 250° to 500° C.

Catalyst

Four monolithic carriers having 400 cells and 0.25 liter were coated with $TiO_2$, $CeO_2$, $ZrO_2$ and $Al_2O_3$, respectively, and then 2 g/liter of Pt was supported thereon, to prepare a catalyst with an arrangement of $Pt/TiO_2$, $Pt/CeO_2$, $Pt/ZrO_2$ and $Pt/Al_2O_3$ juxtaposed in this order from the exhaust gas inlet toward the outlet side. As comparative catalysts, the $Pt/Al_2O_3$ catalyst having 2 g/liter of Pt supported on monolithic carrier having 400 cells and 1 liter and the Cu/zeolite catalyst having 4 g/liter of Cu carried thereon were prepared and similarly evaluated.

Figure 4:
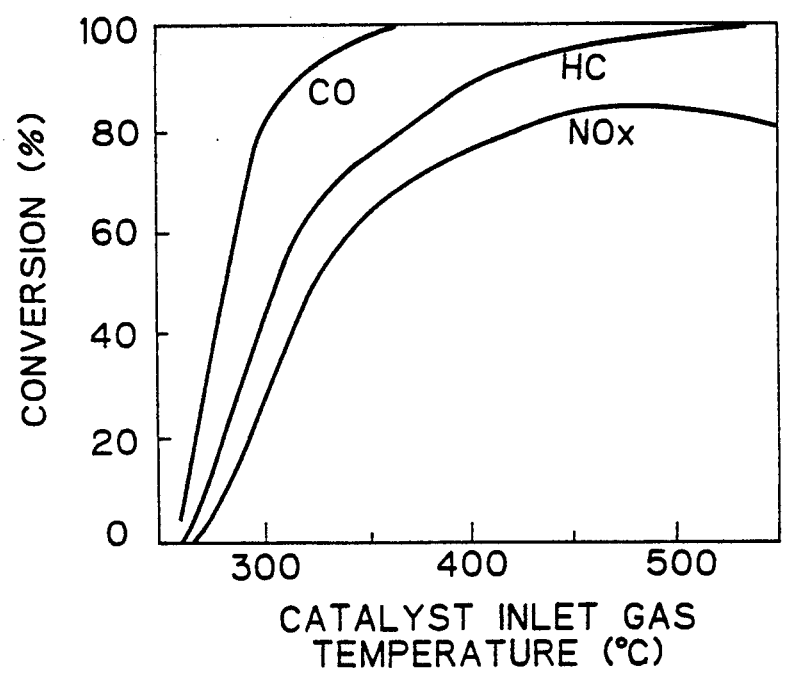
FIG. 4 is a graph showing the relationship between the catalyst inlet gas temperature and CO, HC and $NO_x$ purifying efficiencies (conversions) of the catalyst of Example 4.
Figure 5:
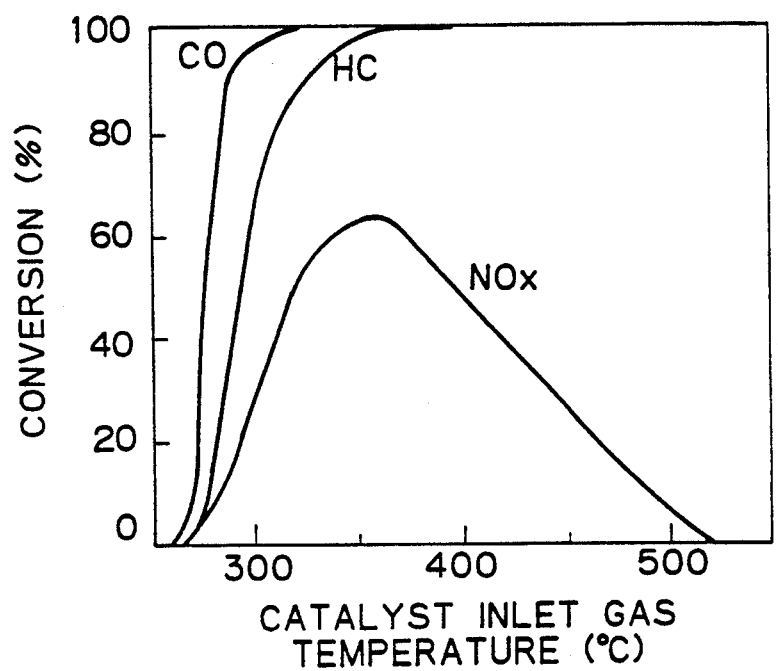
FIG. 5 and FIG. 6 are respectively graphs showing the relationships between the catalyst inlet gas temperature and CO, HC and $NO_x$ conversions (purifying efficiencies) of the catalysts of Comparative Example 4, i.e., $Pt/Al_2O_3$, catalyst and Cu/zeolite catalyst.
Figure 6:
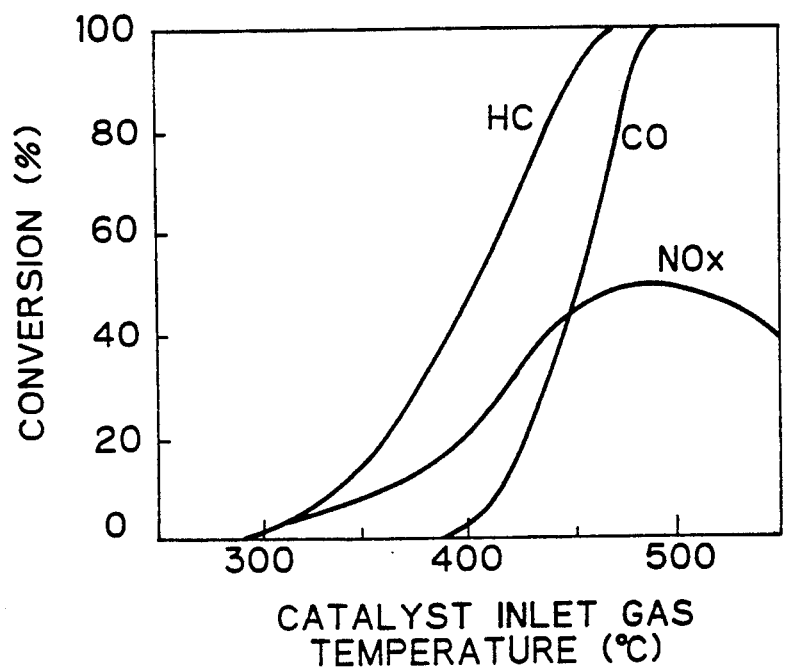

The results are shown in FIG. 4 (the catalyst of the present invention), FIG. 5 ($Pt/Al_2O_3$ catalyst), and FIG. 6 (Cu/zeolite catalyst) which show the relationships between the catalyst inlet gas temperature and the $NO_x$, CO, and HC purifying efficiencies.

From these results, it is clear that the catalyst and the method according to the present invention can efficiently purify $NO_x$, CO, HC over a broad temperature range.

The $NO_x$ reducing reaction under excess oxygen is a balance between the complete oxidation reaction and the partial oxidation reaction of reductive substances with oxygen, and $NO_x$ is reduced at a temperature range wherein a partial oxidation occurs. This may be considered to be because necessary intermediate products for a selective reduction of $NO_x$ are readily formed at temperatures where partial oxidation reactions occur.

To suppress a complete oxidation reaction, the electron state of noble metal may be changed. It may be considered that the excellent effect of the present invention as mentioned above appears in the catalyst of the present invention due to the SMSI (Strong Metal Support Interaction) effect with the carrier oxide.

We claim:

1. A method for purifying an oxygen rich exhaust gas by catalytically reducing nitrogen oxides with carbon monoxide and hydrocarbons contained therein which comprises the step of:
   bringing an exhaust gas containing nitrogen oxides into contact with a series of catalysts arranged in the order of, from an upstream side of the exhaust gas to a downstream side,
   (i) Pt supported on $TiO_2$ having a Pt/Ti atomic ratio of 0.001/1 to 1/1,
   (ii) Pt supported $CeO_2$ having a Pt/Ce atomic ratio of 0.001/1 to 1/1,
   (iii) Pt supported on $ZrO_2$ having a Pt/Zr atomic ratio of 0.001/1 to 1/1, and
   (iv) Pt supported on $Al_2O_3$ having a $Pt/Al_2O_3$ weight ratio of 0.001/1 to 0.1/1
   wherein the temperature of said series of catalysts is from 250° C. to 500° C.

2. A method as claimed in claim 1, wherein said oxygen-rich exhaust gas has a temperature of about 300° C.

3. A method according to claim 1, wherein said exhaust gas is brought into contact with said series of catalysts at a space velocity of from 10,000 to 200,000/hour.

4. A method for purifying an oxygen rich exhaust gas by catalytically reducing nitrogen oxides with carbon monoxide and hydrocarbons contained therein which consists essentially of the step of:
   bringing an exhaust gas containing nitrogen oxides into contact with a series of catalysts arranged in the order of, from an upstream side of the exhaust gas to a downstream side,
   (i) Pt supported on $TiO_2$ having a Pt/Ti atomic ratio of 0.001/1 to 1/1,
   (ii) Pt supported $CeO_2$ having a Pt/Ce atomic ratio of 0.001/1 to 1/1,
   (iii) Pt supported on $ZrO_2$ having a Pt/Zr atomic ratio of 0.001/1 to 1/1, and
   (iv) Pt supported on $Al_2O_3$ having a $Pt/Al_2O_3$ weight ratio of 0.001/1 to 0.1/1
   wherein the temperature of said series of catalysts is from 250° C. to 500° C.

* * * * *